(12) United States Patent
Toyama

(10) Patent No.: US 6,229,918 B1
(45) Date of Patent: May 8, 2001

(54) SYSTEM AND METHOD FOR AUTOMATICALLY DETECTING CLUSTERS OF DATA POINTS WITHIN A DATA SPACE

(75) Inventor: Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/175,181

(22) Filed: Oct. 20, 1998

(51) Int. Cl.[7] ........................................ G06K 9/48
(52) U.S. Cl. ................. 382/173; 382/199; 382/203; 382/225; 382/241
(58) Field of Search .................. 382/103, 173, 382/225, 241, 236, 199, 203; 348/169, 172, 171

(56) References Cited

U.S. PATENT DOCUMENTS

| | | | | |
|---|---|---|---|---|
| 4,739,401 | * | 4/1988 | Sacks et al. | 382/103 |
| 4,802,230 | * | 1/1989 | Horowitz | 382/199 |
| 4,901,362 | * | 2/1990 | Terzian | 382/103 |
| 4,922,915 | * | 5/1990 | Arnold et al. | 382/173 |
| 5,245,674 | * | 9/1993 | Cass et al. | 382/200 |
| 5,604,822 | * | 2/1997 | Pearson et al. | 382/199 |
| 5,748,778 | * | 5/1998 | Ouoguchi | 382/199 |
| 5,995,663 | * | 11/1999 | Itsuzaki et al. | 382/203 |

OTHER PUBLICATIONS

Baroui et al. "Robust Segmentation of Echocardiographic Sequences Through Spatiotemporal Planning and by Knowledge–Based Local and Global Methods." Computers in Cardiology 1998, pp. 453–456, Sep. 1998.*

* cited by examiner

*Primary Examiner*—Jon Chang
(74) *Attorney, Agent, or Firm*—Lyon, Harr & DeFrank, LLP; Edmond A. DeFrank; Craig S. Fischer

(57) ABSTRACT

The present invention is embodied in a system and method for automatically detecting desired clusters within a data space with a radial spanning device. The radial spanning system and method finds, within a data space, connected clusters or "blobs" defined by a cluster of data points. Given a probability density on data points for class inclusion and a seed point in the data space, the radial spanning system and method of the present invention finds an approximately, strongly connected cluster of data points of that class. Exploratory spokes are traversed radially outward from the seed point. Each spoke has a start point (seed point) and a final endpoint and is governed by forces based on underlying data space data points, class probability densities, internal expansion, and interspoke springs. The final endpoints of the spokes are connected to form a polygon that circumscribes the cluster of data points found.

38 Claims, 7 Drawing Sheets

SYSTEM AND METHOD FOR AUTOMATICALLY DETECTING CLUSTERS OF DATA POINTS WITHIN A DATA SPACE

BACKGROUND OF THE INVENTION

1. Field of the Invention

The present invention relates to a system and method for processing data, and in particular, a system and method for automatically detecting and tracking clusters of data points within a data set or data space with a radial spanning device.

2. Related Art

Automatic data detection and tracking of clusters of data points within a data space is becoming increasingly useful. Data space can be represented by data sets containing data points. Each data point can be represented by a single discrete value (one-dimensional) or by numerous values (multi-dimensional). Typically, each data set contains clusters of data points, each represented by similar or identical values. It is desirable to group this cluster of data points together within a class. For example, a data set containing health information might have data points represented by numerous health values, such as height, weight, body fat, blood pressure, pulse rate, etc. for males and females of all ages and of all ethnic origins. A typical search or query might require detection and tracking of clusters of data points having height-weight values for 20-year-old American males in the set of all conceivable height-weight pairs.

One way to find these data points would be to perform a digital database search. However, database searches do not detect and track clusters of data points, but instead typically only find and sort data values. Statistical sorting methods are used to track and group clusters of data points. However, these statistical methods are usually complex and require extensive memory and processing overhead.

In addition, automatic data detection and tracking is useful for image data. For instance, real-time vision-based systems typically use object tracking and object detection (also referred to as "blob tracking" and "blob detection") systems to digitally detect and track objects within a data space, such as an image. The objects are typically nebulous collections of data points, such as image pixels, which satisfy some property and which often occupy a region or regions within the image.

Three methods commonly used to track blobs include moment computations, connected component analysis, and active contour models. With the moment computation method, some initial spatial filtering is assumed, where pixels outside of a given region are completely ignored. This process is sometimes referred to as windows-based tracking. In other words, "windows" force a restricted region of computation. Classification of pixels within a window can be used to compute position and approximate shape of the object by performing moment computations on the pixels in the window (the remaining pixels). For example, centroid and higher order moments can be computed. The centroid computation allows approximation of the position and the higher order moment computations aid in indicating the shape. Moment computations require $O(n)$ operations and are frequently distracted by objects with similar attributes in the image.

In connected component analysis, pixels that are immediately adjacent to some seed pixel are tested for inclusion in a class. Pixels which fall into the class are added to the cluster and recursively analyzed for adjacency to other pixels and so on, until no other pixels are added to the cluster. Connected component analysis requires $O(n)$ operations, where n is the number of pixels in the object. In addition, the morphological operations of dilation and erosion precede the analysis, and so the hidden coefficients can become large. Finally, connected component analysis is especially prone to being distracted by background pixels with similar properties.

The third method, active contour models, also referred to as snakes, in more efficient formulations requires between $O(\sqrt{n})$ and $O(n)$ operations, depending on the shape. This is because snakes only process pixels near the perimeter of an object. Snakes attempt to balance internal forces, which affect degree of curvature of the snakes, and image forces, which nudge the snakes toward image features such as edges. For object tracking, image forces would attract snakes toward boundaries between pixels that satisfy a class constraint and pixels that do not. Although snakes can be computed efficiently, they are known to be prone to distractions. In addition, in some cases (as, for example, when no high-frequency edges are detected), adaptations to make the snake work can require significant additional computation.

Therefore, what is needed is an effective and efficient technique for detecting and tracking clusters of data within a data space. What is also needed is a fast automatic data tracking technique that is robust to distractions and that can produce an approximate estimate of the characteristics of the clusters of data.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for automatically detecting desired clusters of data points within a data set or data space with a radial spanning system and method. For example, the system and method detects and tracks clusters of data points within a data space.

The radial spanning system and method finds related data points or "blobs" of data defined by a cluster of data points. Given a probability density on data points for class inclusion and a seed point in the data set, the radial spanning system and method of the present invention finds an approximately, strongly connected cluster of data points of that class. The radial spanning system and method of the present invention finds "blobs" of data points defined by a cluster of data points having similar or identical values.

Specifically, exploratory spokes are traversed radially outward from the seed data point. Each spoke has a start point (seed point) and a final endpoint and is governed by forces based on underlying data points, class probability densities, internal expansion, and interspoke springs. The final endpoints of the spokes are considered perimeter data point endpoints and are connected to form a polygon that circumscribes the cluster of data points found. The radial spanning system and method is fast and robust. For example, for image applications, if n is the number of pixels in the cluster, the present invention performs $O(\sqrt{n})$ operations for shapes with low eccentricities. Also, the radial spanning system and method of the present invention is relatively fast, and thus, would be valuable for data searching applications. In addition, the radial spanning system and method of the present invention has relatively high tolerance to distractions. Therefore, it is ideal for "blob tracking," an activity typically performed in the real-time vision based systems as a means to quickly determine a region of interest within an image.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Data tracking and detection is becoming increasingly important in many computer applications. For example, a data set can contain numerous data points, each represented by data values. The data values can be categorized within classes or varying data subsets. Automatic digital tracking and detection of the data values within the data set can provide quick and easy classification of the data values, which is desirable for statistical analyses. The present invention automatically detects and tracks clusters of data points and defines a perimeter around the clusters. The clusters of data points can be data points having values within a pre-selected class. In the system and method of the present invention, first, key features of the data space, such as target data point clusters are determined. Next, the cluster of data points are identified, detected and tracked, in a robust, real-time, and non-intrusive way.

Exemplary Operating Environment

Figure 1:
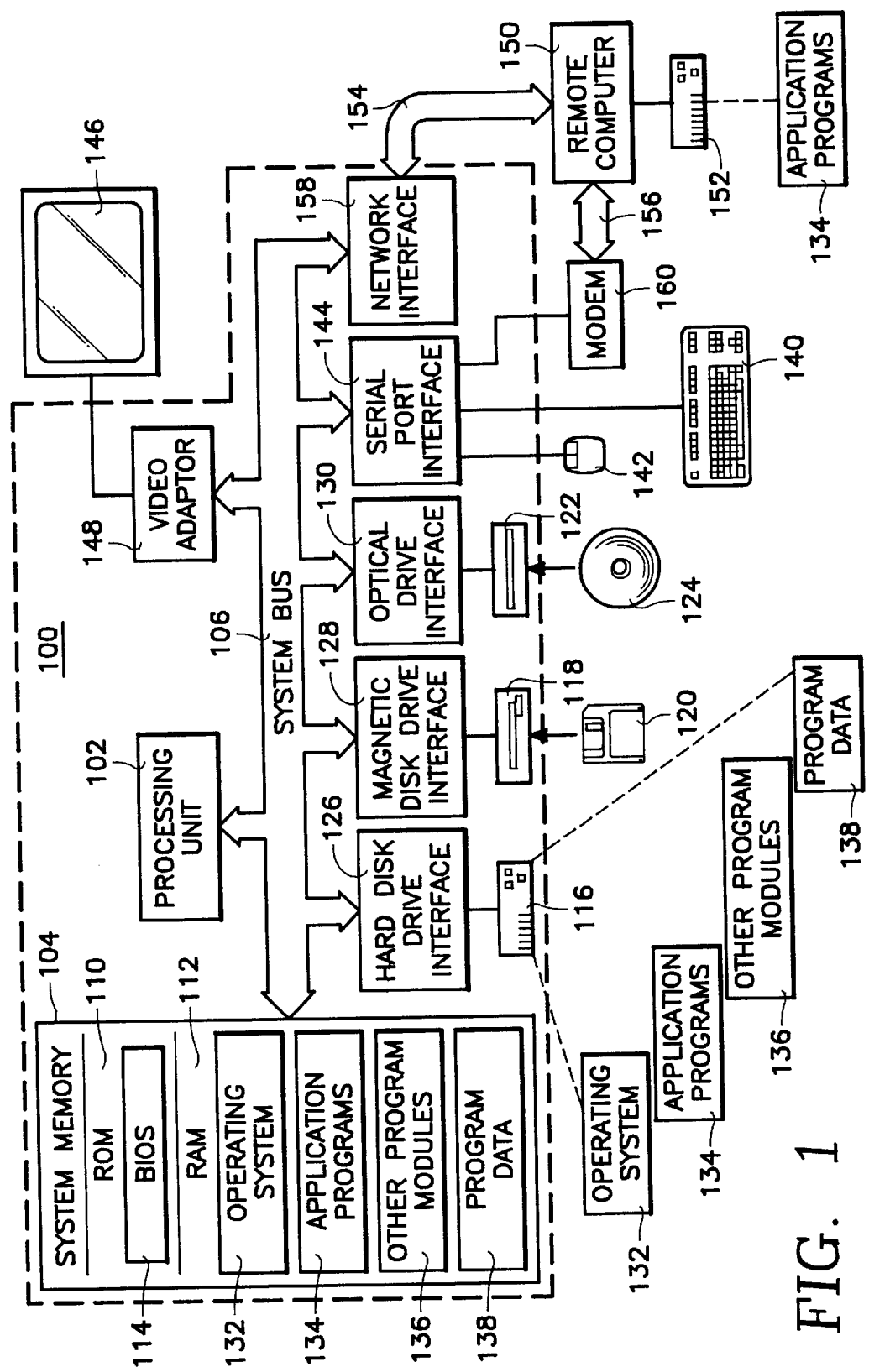
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that helps to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 130, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used.

General Overview

The following description describes the present invention in terms related to detection and tracking of data values with a data space or data set. The data set or data space can represent any suitable cluster of information, including image and non-image information. For image information, the data set or data space is an image and the data values are pixels of the image. Clusters of pixels within the image can define objects. The objects can be tracked and detected in accordance with the present invention. Thus, the following description of the invention in terms of data space and data values is presented for the purposes of illustration and description. It is not intended to be exhaustive or to limit the invention to the precise form disclosed. Many modifications and variations are possible.

Figure 2:
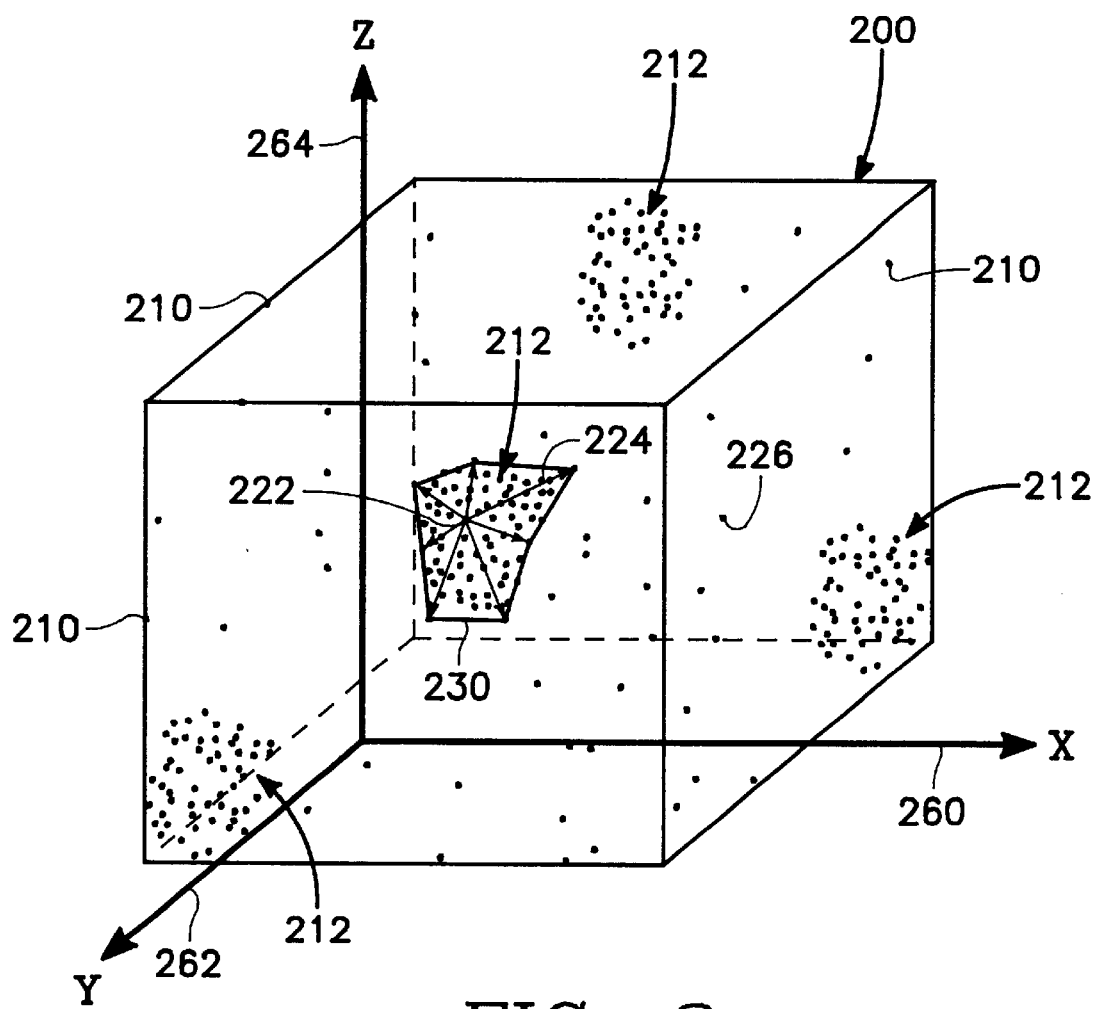
FIG. 2 shows a data space with data points detected by the present invention.

FIG. 2 shows a digital data space comprised of clusters of data values or data points to be detected by the present invention. FIG. 2 represents a digital data space, such as a set of data points comprised of one or more clusters of the data points. For example, as shown in FIG. 2, a data space 200 is comprised of a plurality of data points 210 that can define one or more clusters 212. Also, each cluster 212 can be grouped with other clusters to form related or connected clusters. The present invention is adapted to detect and track selected clusters 212 and define the clusters by, for example, extending a calculated perimeter 230 around the selected clusters. In addition, the clusters can be detected and tracked as static data sets that are stationary with respect to time, or dynamic data sets that change over time.

Figure 3:
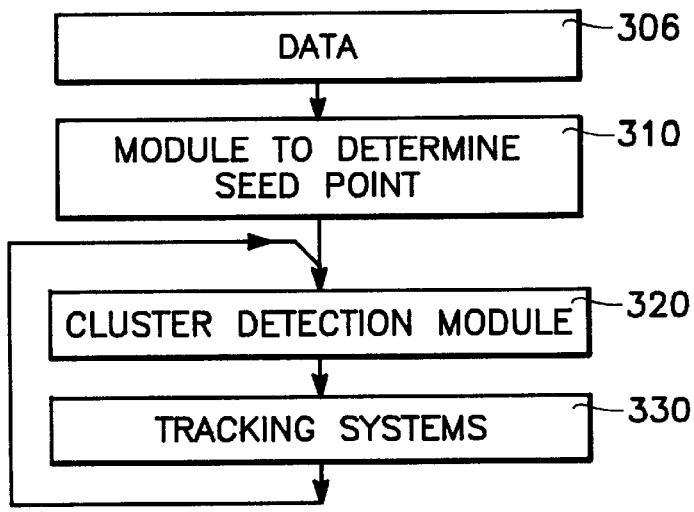
FIG. 3 is an overview block diagram illustrating the general components of the system of the present invention.

Overview of Components:

FIG. 3 is an overview block diagram illustrating the general components of the system of the present invention. Referring to FIG. 3 along with FIG. 2, each cluster 212 of data points is typically a subset of related values of the entire set of data. As such, plural data points define each cluster and each data point is defined by discrete information, such as a data value. In one example, the discrete information could be health related data values. In this example, for a data set of all conceivable height-weight pairs for all people, a cluster of data values could be height-weight possibilities for 20-year-old American males and another cluster could be height-weight possibilities for 35-year-old European females. The present invention is adapted to detect and track these selected clusters as static data, i.e., for a given period of time, such as a certain year, or as dynamic data, i.e., over a period of time, such as multiple years.

For tracking and detecting the clusters 212 of data points, the data is first sent to a module 310 that determines a seed data point 222. Any suitable system or method can be used to determine the seed data point 222. For tracking applications, the seed data point 222 is usually the predicted centroid of the cluster 212. The seed data point 222 is a data point that is known to be located within the data set 200. Seed data point 222 is defined by the discrete value information. Data points within a neighborhood surrounding seed data point can have identical value information, slightly varying value information that is within a defined class, or grossly varying value information that is not within the defined class. Typically, if neighborhood data points 224 have identical values or values within the defined class, then those neighborhood data points 224 are assumed to be part of the cluster 212. In contrast, if other neighborhood data points 226 have values that grossly vary from the seed data point, and they are not aberrational noise, those neighborhood data points 226 are assumed to be part of a new cluster, such as cluster 226.

After the module 310 receives the data 306 and determines a seed data point, a cluster detection module 320 detects and tracks clusters within the data space 200 and produces results in accordance with the present invention. The cluster detection module performs an exploratory cyclic process. The exploratory process includes expand, contract and spring steps. In the expand step, plural spokes expand from the seed data point to a subsequent data point (initially, the spokes expand a predefined step size of data points). In the contract step, the spokes contact from the subsequent data point and in the spring step, the spokes are subject to spring forces, which can be during expansion and contraction, in accordance with the present invention. The exploratory steps do not have to be in any particular order and can be performed in any suitable order. In addition, each cycle of the exploratory steps can be performed with varying sequences or with the same sequence. Details of the cluster detection module will be discussed in detail below.

Any suitable analysis system 330 can be coupled to the cluster detection module 320 for receiving the results. Also, the cluster detection module 320 can receive data about the data space 200 from the system 330 for feedback purposes to improve results of the cluster detection module 320.

Figure 4:
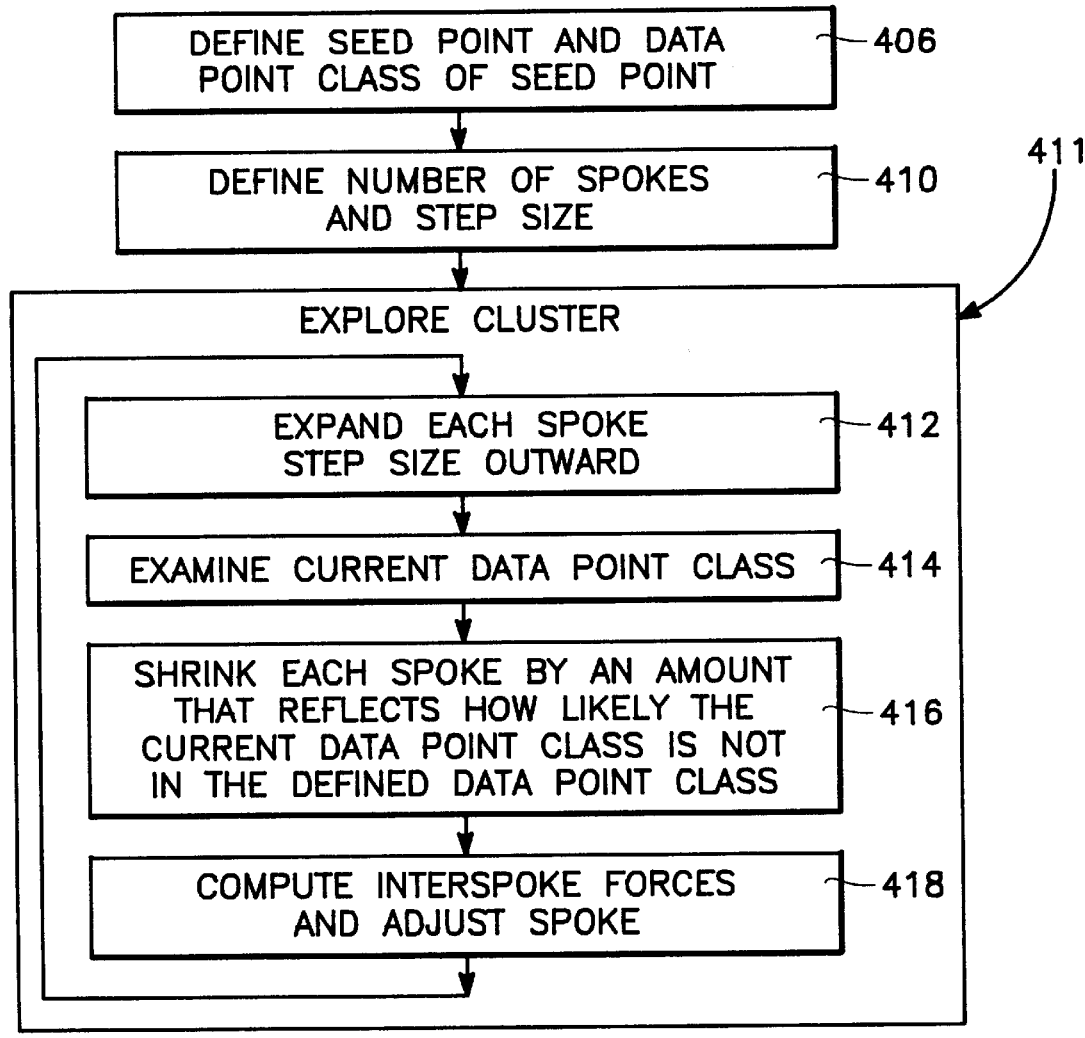
FIG. 4 is an overview flowchart illustrating the general operation of the system of the present invention.

Overview of Operation:

FIG. 4 is an overview flowchart illustrating the general operation of the system of the present invention. In general, for each cluster being detected, first, preferably, a seed data point is defined by a location within the cluster and to be within a predefined class, such as a data point class having a range of discrete values (box 406). Second, preferably, the number of spokes of the cluster detection module to be traversed from the seed point is defined (box 410). Third, the cluster is explored (box 411). The cluster can be explored by cycling through the exploratory steps defined within box 411 for exploration. The exploratory steps within box 411 do not have to be in any particular order and can be performed in any suitable order. In addition, each cycle of the exploratory steps within box 411 can be performed with varying sequences or with the same sequence.

A random sequence of exploratory steps is shown within box 411 of FIG. 4 for illustrative purposes only. For example, as shown in FIG. 4, in one step, each spoke is expanded the predefined step size number of data points outward (box 412). The data point class for each current data point is examined (box 414). In another step, each spoke is contracted by an amount based on the likelihood that the current data point class is not in the defined data point class (box 416). In a further step, interspoke forces are computed and used to appropriately adjust the spoke (for example, contract the spoke) to further aid in defining the perimeter of the cluster being detected (box 418). The above example describes one cycle or iteration of spoke traversal. A predetermined number of iterations can be performed (or until stabilization is achieved) by routine loop defined between boxes 412 and 418 as shown in FIG. 4. The number of iterations is dependent on the accuracy desired, with consideration given to memory and processing overhead.

Figure 5:
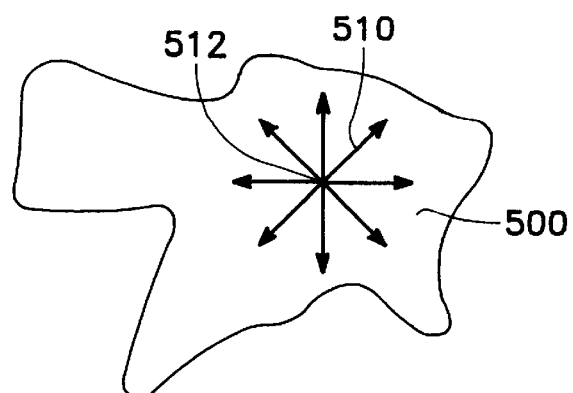
FIG. 5 is a detailed view of the cluster after initial processing of the data space by the radial spanning system and method of the present invention.

Details of the Radial Spanning System and Method:

FIG. 5 is a detailed view of a cluster after initial processing of the data space by the radial spanning system and method of the present invention. As discussed above, a cluster of data points 500 can be detected and tracked by the radial spanning system and method of the present invention. Exploratory spokes 510 traverse (expand, contract and spring) radially from a seed point 512 of the cluster 500. The number of spokes (hereinafter referred to as m) used to radially traverse the cluster 500 is dependent on the precision and accuracy required, with consideration given to memory and processing overhead.

A function, for example a Boolean function, such as f(x), is predefined as a function that assigns a value between [0.0] and [1.0], inclusive, to a data point at position x in a data space according to its probability of being with a particular class. The [1] notation denotes that the data point is within the class with certainty, and [0] denotes that the data point is not within the class with certainty. The range indicates the likelihood that the data set point x lies in the cluster 500, which is defined by a desired class, such as a class with similar data point values (for example, for detection of health data, similar age, sex, origin, etc. values). The initial seed data point 512, such as x*, is predefined as a data point that is known to lie in the cluster 500, and thus likely to be within the desired class. For instance, for tracking applications, the seed point could be defined as the predicted centroid of the cluster.

FIGS. 6A–6E are detailed views of selected data points of the cluster illustrating the data space forces. Forces based on underlying data points, class probability densities, internal expansion, and interspoke springs govern each spoke and their final endpoint. Namely, referring back to FIG. 4 along with FIGS. 6A–6E, first, the seed point, data point class, step size, and m number of spokes are defined (boxes 406 and 410 of FIG. 4). Each of m spokes is indexed preferably counterclockwise by i, where $0 \leq i \leq m$, and vector $x_i$ is set as initial seed point x* and vector $v_i$ is set as:

$$[\cos(2\pi i/m), \sin(2\pi i/m)]^T.$$

Figure 6A:
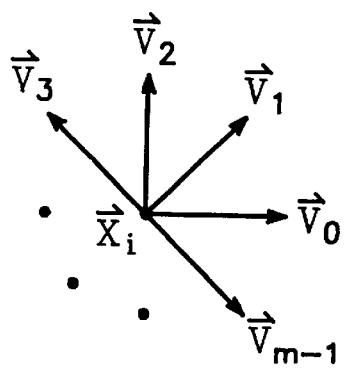
FIGS. 6A–6E are detailed views of clusters of data points of the data space illustrating the data space forces.

Hence, $x_i$ is a position vector of the initial seed point and $v_i$ is a direction vector of the first spoke. As such, position vectors $x_{0,1,2...m-1}$ are the seed points for direction vectors $v_1$ (the second spoke), $v_2$ (the third spoke) . . . up to direction vector $v_{m-1}$, respectively, as shown in FIG. 6A.

Figure 6B:
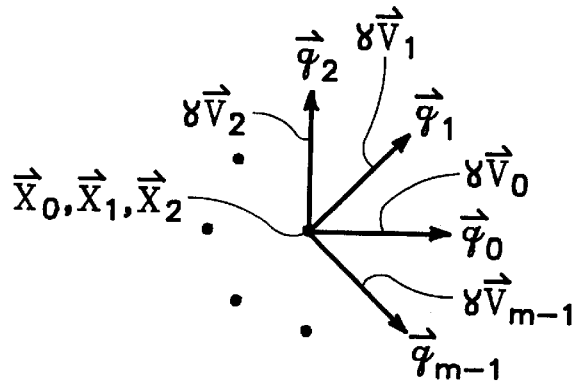

Referring to FIG. 6B and FIG. 4, for expansion, each of m spokes is expanded radially outward (box 412 of FIG. 4) for each cycle or iteration. This is accomplished for each iteration by multiplying expansion multiplier γ (defined step size) to each direction vector during expansion. This allows all spokes to grow by length y to position vector $q_{0,1,2...m-1}$ for each respective direction vector $v_{0,1,2...m-1}$ as shown in FIG. 6B. Third, the current data point class is examined (box 414 of FIG. 4) at position vector $q_{0,1,...m-1}$. Thus, for some fixed number of iterations, l, or until $x_i$'s are stable and assuming $0 \leq i \leq m$, expansion will be:

$$\vec{q} = x_i + \gamma v_i.$$

Figure 6C:
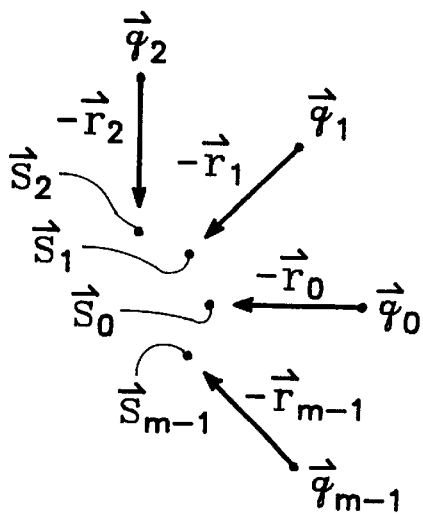

Referring to FIG. 6C, for contraction, each spoke is subject to inward forces based on the results of the above examination (box 416 of FIG. 4). Namely, inward forces contract the spokes as direction vectors $-r_{0,1,2...m-1}$ from position vectors $q_{0,1,2...m-1}$ to new position vectors $s_{0,1,2...m-1}$. For some fixed number of iterations, l, or until $x_i$'s are stable and assuming $0 \leq i \leq m$ the inward forces can be represented as:

$$\vec{r} = (1 - f(\vec{q}_i))(\vec{v}_i),$$

wherein f is a function which maps points in the data space to the range [0,1], indicating the likelihood that the data point lies in the class. The total of all previous forces can be represented by:

$$\vec{s} = \vec{q} - \vec{r},$$

as shown in FIG. 6C. It should be noted that since $r_i$ represents inward forces that aid in finding the endpoint of the cluster, $r_i$ only contracts the spokes when $q_i$ is not 100% in the data point class. As such, $r_i$ will be greater than zero and contract the spoke only if the data point at $q_i$ is not 100% in the data point class. In other words, if $q_i$ is at a data point that still lies within the cluster, the spokes are preferably not contracted and the spokes will continue to expand outward with the next iteration.

Referring to 6D and FIG. 4, for spring force action, the interspoke or spring forces are computed (box 418 of FIG.

Figure 6D:
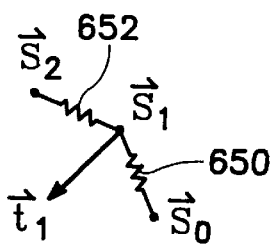

4) and used to appropriately adjust the spoke by, for example, contracting the spoke, to further aid in defining the perimeter of the cluster being detected. For one data point, as shown in FIG. 6D, $t_1$ is a small vector coming from $s_1$. The vector $t_1$ is the sum effect of the imaginary spring forces 650 between $s_1$ and $s_0$ or imaginary spring forces 652 between $s_1$ and $s_2$. In other words, this computation considers neighboring data point values and averages forces to create an interspoke spring. Specifically, for some fixed number of iterations, l, or until $x_i$'s are stable and assuming $0 \leq i \leq m$, spring forces represented by:

$$\vec{t}_i = \frac{k(2\vec{s}_i - \vec{s}_{prd(i)} - \vec{s}_{suc(i)}) \cdot \vec{v}_i}{|2\vec{s}_i - \vec{s}_{prd(i)} - \vec{s}_{suc(i)}|}$$

act on the spokes, where prd(i) and suc(i) are immediate predecessor and successor indices of i, respectively. It should be noted that the indices wraparound whenever they fall outside the range [0, m−1]. As a result, position vector $s_i$ is subject to direction vector $t_i$, as shown in FIG. 6D and thus:

$$\vec{x}_i = \vec{s}_i + \vec{t}_i.$$

Figure 6E:
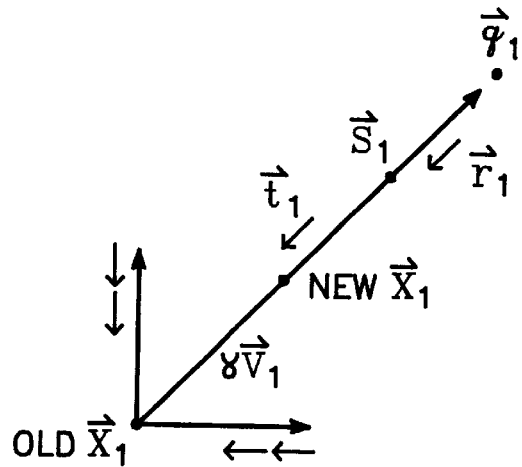

FIG. 6E illustrates a vector pictorial of one spoke, such as the spoke that originated from $x_1$. For one iteration, FIG. 6E illustrates as old $x_1$ becomes new $x_1$ after action by outward expansion forces ($\gamma v_i$), inward forces ($r_1$), and interspoke or spring forces ($t_1$).

Figure 7:
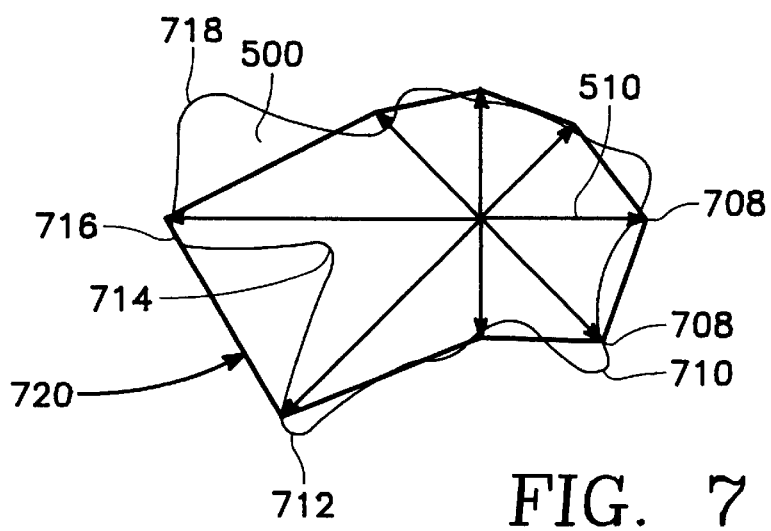
FIG. 7 is a detailed view of the cluster of data points after basic processing of the data set by the radial spanning system and method of the present invention.

FIG. 7 is a detailed view of the cluster after basic processing of the data space by the radial spanning system and method of the present invention. Referring to FIGS. 4–6 along with FIG. 7, an iterative cycle (such as the cycle described in FIG. 4) is preferably used to expand, contract and spring the spokes 510 until a final endpoint or perimeter data point 708 is located. The final endpoints or perimeter data points 708 of the spokes are connected to form a polygon 720 that circumscribes the cluster 500 or cluster of data points defined by the data point class that is being tracked or detected. Since m is fixed and the number of loop iterations is either 1 (another constant) or a variable that varies approximately with the diameter of the cluster, detecting the perimeter of the cluster takes at most $O(\sqrt{n})$ operations. The perimeter data points $x_i$ are the vertices of the polygon 720, which is an approximation of the perimeter of the cluster.

One hidden coefficient in the $O(\sqrt{n})$ running time is the time required to compute f (x). The present invention is particularly well-suited for finding clusters of data points of a data space for certain color or intensity constraints or for finding objects of motion against a static background (these operations only require inspection of a single data point to compute f). However, it can also be applied to flow fields, the output of edge detection systems, and other vision based systems, as well as general data space detection and tracking. In most, if not all cases, running times are scaleable with the time it takes to compute f.

Figure 8:
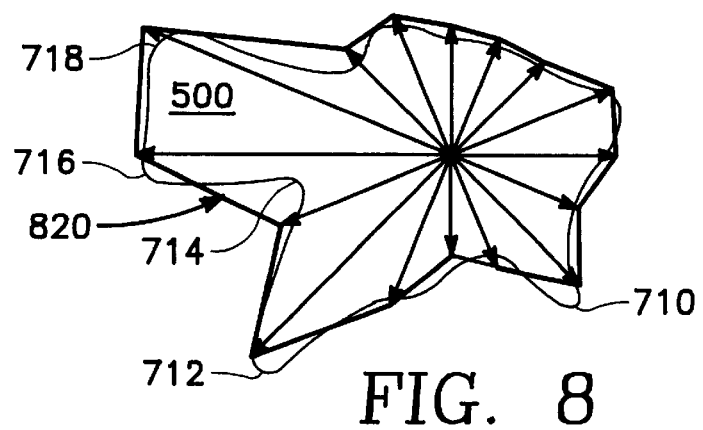
FIG. 8 is a detailed view of the data space after enhanced processing of the data space by the radial spanning system and method of the present invention.

FIG. 8 is a detailed view of the cluster after enhanced processing of the data space by the radial spanning system and method of the present invention. The parameters m, l, γ, and k need to be carefully chosen. The number of spokes, m, will determine the detail with which the cluster perimeter is found. Larger values will generally result in more precise estimates. Namely, increasing the number of exploratory spokes can enhance the accuracy and precision of the radial spanning system and method of the present invention. Referring to FIGS. 5–7 along with FIG. 8, for example, the exploratory spoke configuration of FIG. 8 will track cluster 500 that has irregular edges 710, 712, 714, 716, 718 with greater accuracy than the spoke configuration of FIG. 7. Thus, the spoke configuration of FIG. 8 will produce a polygon 820 that is closer to the actual shape of the cluster 500 than the polygon 720 produced by the spoke configuration of FIG. 7. Although additional spokes require additional computations, cluster detection accuracy is increased and may be required for some applications.

With regard to outward expansion, the outward expansion coefficient, γ, determines the size of holes in the cluster that will be ignored during the search for the cluster's perimeter. For instance, larger values will make the present invention ignore larger holes in the cluster. In contrast, smaller values will make the present invention stop at smaller holes in the cluster. With regard to the spring constant k, it determines how jagged the polygon will be, with larger values smoothing the perimeter. With regard to setting l, the combination of m, γ and k determines the maximum size achievable by the cluster, and this can be used to set l.

In addition, given a point x', the present invention can determine in O(1) time whether the point occurs within the cluster. First, the index of a spoke, j, which is defined to lie immediately clockwise to x', is found by:

$$j = \lfloor (m \arctan_2(x' - x^*))\rfloor/2\pi,$$

where x* is the cluster seed point and $\arctan_2$ takes a vector and returns a value in $[0, 2\pi]$ representing the vector orientation. Next, the vector cross product:

$$(x_{suc(j)} - x_j) \times (x' - x_{suc(j)})$$

If the sign of this value is positive, the point lies within the cluster, if negative, the data point lies outside (a zero value indicates a perimeter point). From this, the size and centroid of a cluster can be computed in O(m) operations by summing the respective areas or weighted centroids of each triangle described by the points x*, $x_j$, $x_{suc(j)}$.

Figure 9A:
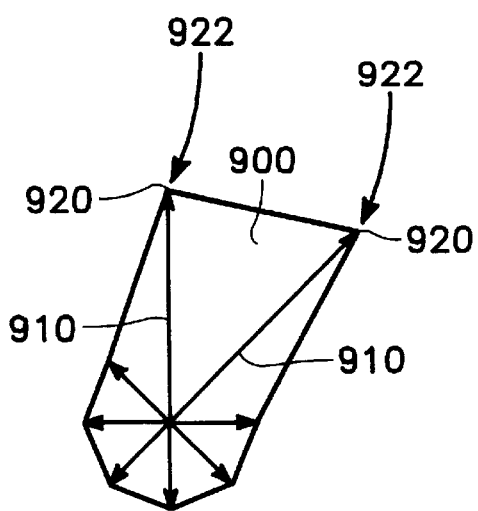
FIG. 9A is a detailed view of selected data points of the data space after initial processing of the data space by an alternative radial spanning system and method of the present invention for sparse data.
Figure 9B:
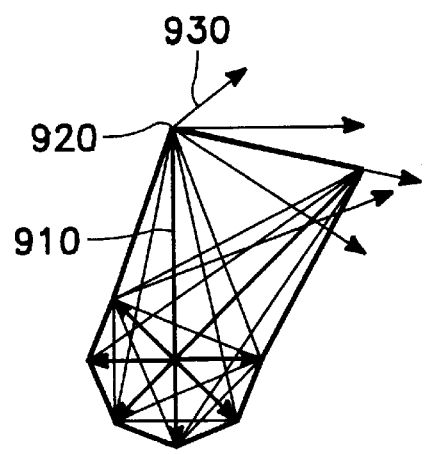
FIG. 9B is a detailed view of selected data points of the data space after final processing of the data space by an alternative radial spanning system and method of the present invention for sparse data.

Recursive Radial Spanning:

FIG. 9A is a detailed view of selected data points of a cluster of data points after initial processing of the data space by an alternative radial spanning system and method of the present invention for sparse data. The radial spanning system and method of the present invention can be adapted to detect clusters of data points with complex convexities. Recursive radial spanning is one way to detect complex clusters of data points 900. With recursive radial spanning, all spokes 910 or each spoke that is locally convex (convex with respect to its neighboring spokes) initiates a recursive radial span with its endpoints 920 as a new seed point 922.

FIG. 9A is a detailed view of selected data points of the cluster after secondary processing of the data space of FIG. 9a by the alternative radial spanning system and method of the present invention for sparse data. Spokes 930 in the new radial span whose directions fall back into the original cluster 900, should not be further processed. After recursive radial spanning, any suitable method or technique can be used to find the combined perimeter. The results of the new radial span can be "sewn" back onto the original cluster 900, if a single shape descriptor is necessary.

Sparse Data:

The radial spanning system and method of the present invention can be adapted to detect clusters of data points that have data points that occur sparsely. Namely, if data point density information is known, a new radial system and method can be used to detect and track sparse data. In other words, a region around an initial data point is explored with the spokes instead of exploring specific data points. For example, if it is assumed that only one of every 1/p data points uniformly distributed with the cluster is expected to satisfy class constraints, then the computation of $r_i$ above is replaced by computing f(x) for all x in an area, such as a disc, Q, with size $\phi/p$ surrounding $q_i$ and setting $r_i$ equal to $(1-(\max_{x \in Q} f(x)))(v_i)$, where $\phi$ is a constant. The constant $\phi$ is preferably set so that it maximizes the probability of a data point being classified as located within the cluster, while it minimizes the probability of classification outside of the cluster.

Figure 10A:
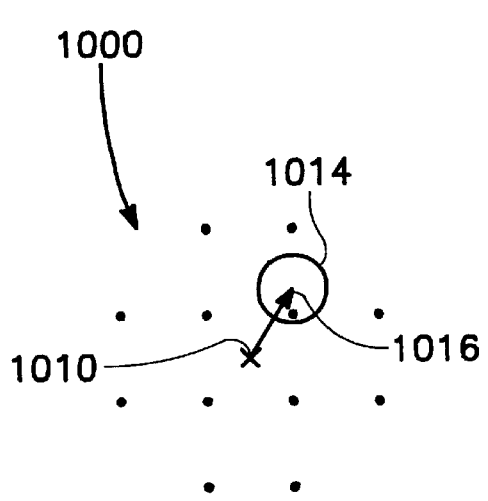
FIG. 10A is a detailed view of selected data points of the cluster of data points after initial processing of the data space by an alternative articulated radial spanning system and method of the present invention.
Figure 10B:
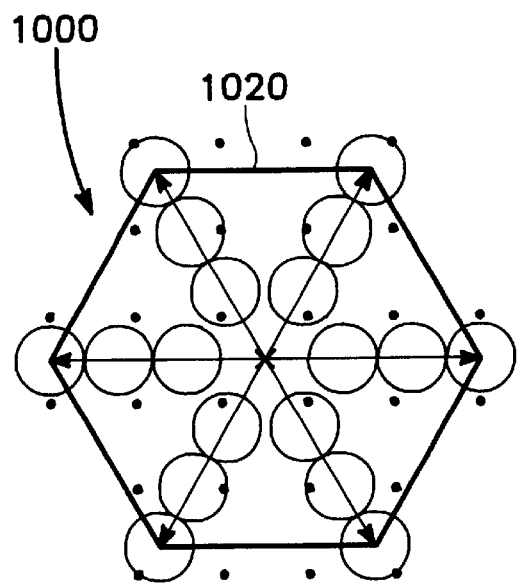
FIG. 10B is a detailed view of selected data points of the cluster of data points after final processing of the data space of FIG. 10A by an alternative articulated radial spanning system and method of the present invention.

For example, FIG. 10A is a detailed view of selected data points of the cluster after initial processing of the data space by an alternative articulated radial spanning system and method of the present invention. If the radial spanning system and method of FIGS. 1–8 were used on sparse data, it would be difficult to properly classify a data point. As a result, inward forces and spring forces would cause corresponding spokes to shrink. In the alternative, for a cluster 1000 defined by sparse data, a seed data point 1010 initiates a spoke 1012 that inspects a region 1014 surrounding the data point 1010 and locates a data point 1016 in the class to prevent being dominated by the inward forces, as shown in FIG. 10A. Iterative processing allows the modified radial spanning system and method for sparse data to determine an approximate perimeter 1020 of the cluster of data points 1000, as shown in FIG. 1 OB, which is a detailed view of selected data points of the cluster after final processing of the data space of FIG. 1 OA. It should be noted that, as discussed above, the size of the search region is proportional to $\phi$.

Multiple Dimensional Applications:

The radial spanning systems and methods can be extended naturally to multiple dimensions by allowing the spokes to extend radially in full space (N-dimensions). For a fixed number of spokes, m, the radial spanning system and method of the present invention operates with time complexity $O(n^{1/m})$, as opposed for $O(n)$ operations for connected components or windows-based system and methods. For example, FIG. 2 illustrates a three dimensional data space 200 defined by three data point axes, namely, the X, Y and Z axes (reference numerals 260, 262, 264, respectively). The spokes of the present invention can extend within the 3-dimensional data space 200 to define a 3-D perimeter surrounding a cluster of data points 212.

Working Example

As one example, the radial spanning system and method of the present invention can be used for face tracking applications of data space and vision based systems. Specifically, face tracking applications usually require efficient localization of candidate facial objects and fast color-based tracking. Also, since a face tends to include dense areas of skin tone and its overall shape is typically convex with low eccentricities, the present invention can easily and quickly detect and track a face.

Figure 11:
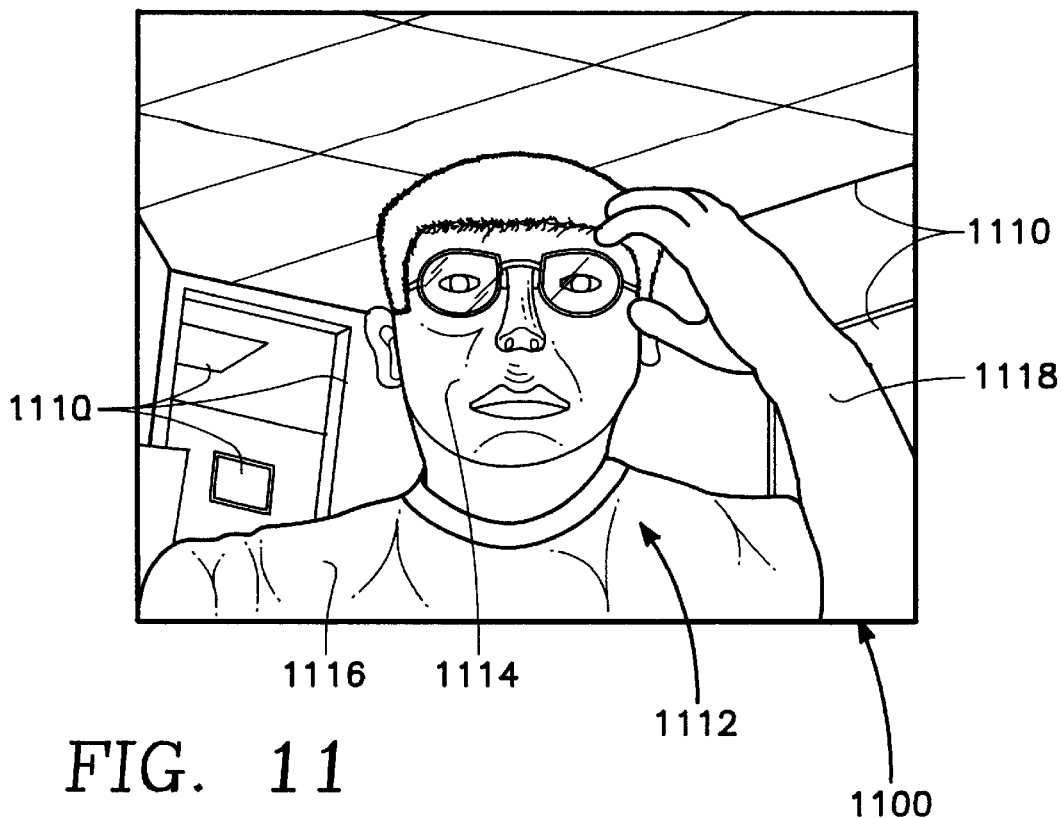
FIG. 11 is a working example showing a static color data space comprising background objects and foreground objects.
Figure 12:
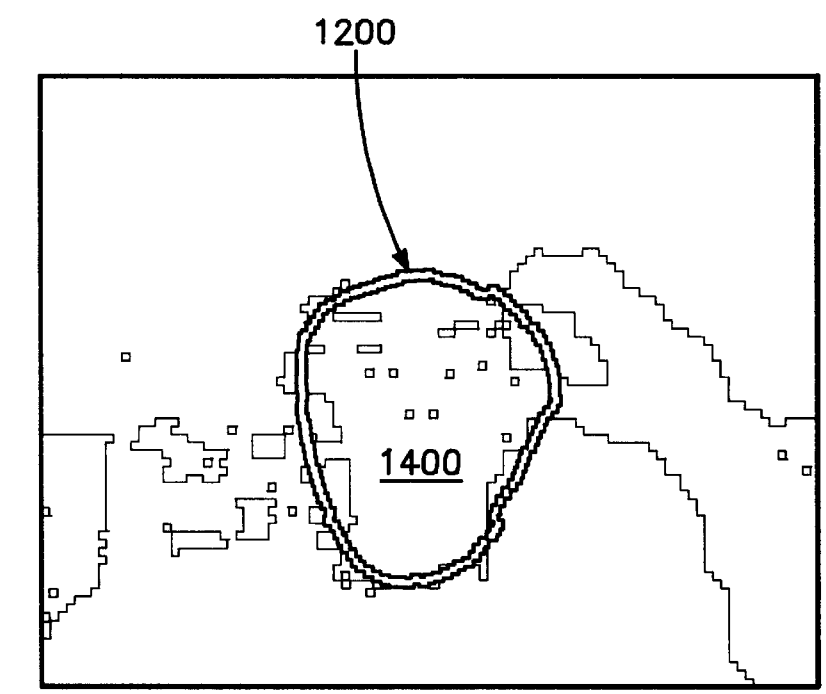
FIG. 12 illustrates typical detection of an object of FIG. 11 from the radial spanning system and method of the present invention.

FIG. 11 is a static color image 1100 comprising background objects 1110 and foreground objects 1112, including a face 1114 and part of an upper body 116 and part of an arm appendage 1118. FIG. 12 illustrates typical detection of the facial object 1114 from the radial spanning system and method of the present invention. As shown in FIG. 12, the facial object 1114 is detected by a polygon 1200 outlining the approximate perimeter of the facial object 1114. It should be noted that although the polygon 1200 is a satisfactory outline of the facial object 1114, results could be enhanced with the system and methods described above.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatically detecting a cluster of data points within a data space, comprising:
    traversing a predefined number of exploratory devices from a seed data point predefined to be located within the cluster;
    performing an exploratory cyclic process that includes expand, contract and spring steps to define a perimeter data point endpoint for each exploratory device; and
    connecting the perimeter data point endpoints to define an outline of the cluster.

2. The method of claim 1, wherein the cluster is comprised of data points, each data point being defined by a discrete value, and wherein the discrete values of all of the data points of the cluster are within a predefined class.

3. The method of claim 2, wherein traversing a predefined number of exploratory devices and defining a perimeter data point endpoint comprises selectively exerting at least one of expansion, contraction and spring forces on a predefined number of exploratory devices to define a perimeter data point endpoint that separates data points having discrete values within the predefined class from data points having values not in the predefined class.

4. The method of claim 1, wherein the data space is a multidimensional data space and wherein the exploratory devices are traversed in multidimensional space.

5. The method of claim 1, further comprising recursively traversing a predefined number of exploratory devices from the perimeter data point endpoints to define secondary data points for each exploratory device.

6. The method of claim 1, wherein traversing a predefined number of exploratory devices and defining a perimeter data point endpoint comprises adjusting each exploratory device to define a perimeter data point endpoint for each exploratory device that separates data points having discrete values within the predefined class from data points having values not in the predefined class.

7. The method of claim 1, wherein the exploratory devices are capable of being subject to spring forces during the expand, contract and spring steps.

8. The method of claim 1 wherein the exploratory cyclic process for each exploratory device is governed by data space forces.

9. The method of claim 8, wherein the data space forces are based on class probability densities.

10. The method of claim 1, further comprising providing a probability density on data points for inclusion within the cluster.

11. A method for automatically detecting a cluster of data points within a data space, comprising:
    traversing a predefined number of exploratory devices from a predefined seed data point located within the cluster, wherein traversing comprises:
    a) expanding each exploratory spoke by a preselected step size to a current data point having discrete values within a current data point class;
    b) contracting each exploratory spoke by an amount that reflects how likely the current data point class is not in the defined data point class;

c) computing interspoke forces and appropriately adjusting each exploratory spoke;

defining a perimeter data point endpoint for each exploratory device; and connecting the perimeter data point endpoints to define an outline of the cluster.

12. The method of claim 11, wherein defining a perimeter data point endpoint comprises repeating steps a)–c) a predetermined amount to define a perimeter data point endpoint for each exploratory device that separates data points having discrete values within the predefined class from data points having values not in the predefined class.

13. A method for automatically detecting a cluster of data points within a data space, comprising:

traversing a predefined number of exploratory devices from a predefined seed data point located within the cluster, wherein traversing comprises expanding the exploratory devices from the seed data point to a subsequent data point and contracting the exploratory devices from the subsequent data point to a new data point, wherein the exploratory devices are subject to spring forces during expanding and contracting;

defining a perimeter data point endpoint for each exploratory device; and connecting the perimeter data point endpoints to define an outline of the cluster.

14. A detection device for detecting clusters of a data space on computer readable memory of a computer system, the detection device comprising:

a cluster detection module stored in the computer readable memory of the computer system for traversing a predefined number of exploratory devices from a seed data point predefined to be located within the cluster, performing an exploratory cyclic process that includes expand, contract and spring steps to define a perimeter data point endpoint for each exploratory device, and connecting the perimeter data point endpoints to define an outline of the cluster.

15. The detection device of claim 14, wherein the cluster is comprised of data points, each data point being defined by a discrete value, and wherein the discrete values of all of the data points of the cluster are within a predefined class.

16. The detection device of claim 15, wherein the cluster detection module is preprogrammed to selectively exert at least one of expansion, contraction and spring forces on a predefined number of exploratory devices to define a perimeter data point endpoint that separates data points having discrete values within the predefined class from data points having values not in the predefined class.

17. The detection device of claim 14, wherein the data space is a multidimensional data space and wherein the exploratory devices are traversed in multidimensional space.

18. The detection device of claim 14, wherein the exploratory devices are exploratory spokes.

19. The detection device of claim 14, wherein the cluster detection module is preprogrammed to adjust each exploratory device to define a perimeter data point endpoint for each exploratory device that separates data points having discrete values within the predefined class from data points having values not in the predefined class.

20. A detection device for detecting clusters of a data space on computer readable memory of a computer system, the detection device comprising:

a cluster detection module stored in the computer readable memory of the computer system for traversing a predefined number of exploratory devices from a predefined seed data point located within the cluster, defining a perimeter data point endpoint for each exploratory device, and connecting the perimeter data point endpoints to define an outline of the cluster, wherein the cluster detection module is preprogrammed to:

a) expand each exploratory spoke by a preselected step size to a current data point having discrete values within a current data point class;

b) contract each exploratory spoke by an amount that reflects how likely the current data point class is not in the defined data point class; and c) compute interspoke forces and appropriately adjust each exploratory spoke.

21. The detection device of claim 20, wherein the detection device is further preprogrammed repeat functions a)–c) a predetermined amount to define a perimeter data point endpoint for each exploratory device that separates data points having discrete values within the predefined class from data points having values not in the predefined class.

22. A detection device for detecting clusters of a data space on computer readable memory of a computer system, the detection device comprising:

a cluster detection module stored in the computer readable memory of the computer system for traversing a predefined number of exploratory devices from a predefined seed data point located within the cluster, defining a perimeter data point endpoint for each exploratory device, and connecting the perimeter data point endpoints to define an outline of the cluster, wherein the detection device is preprogrammed to expand the exploratory devices from the seed data point to a subsequent data point and contract the exploratory devices from the subsequent data point to a new data point, wherein the exploratory devices are subject to spring forces when the exploratory devices are expanded and contracted.

23. A computer-readable memory device encoded with a set of instructions for detecting clusters of a data space, the set of instructions having:

a first subset of instructions directing a predetermined number of exploratory devices to be traversed from a seed data point predefined to be located within the cluster;

a second subset of instructions directing that an exploratory cyclic process including expand, contract and spring steps be used to define a perimeter data point endpoint for each exploratory device; and a third subset of instructions directing the perimeter data point endpoints to be connected to define an outline of the cluster for detecting and tracking the cluster.

24. The computer-readable memory device of claim 23, wherein the cluster is comprised of data points, each data point being defined by a discrete value, and wherein the discrete values of all of the data points of the cluster are within a predefined class.

25. The computer-readable memory device of claim 24, wherein the first subset of instructions directs a predefined number of exploratory devices selectively to be subjected to at least one of expansion, contraction and spring forces and the second parameter value corresponds to a defined perimeter data point endpoint that separates data points having discrete values within the predefined class from data points having values not in the predefined class.

26. The computer-readable memory device of claim 23, wherein the data space is a multidimensional data space and wherein the exploratory devices are traversed in multidimensional space.

27. The computer-readable memory device of claim 23, wherein the exploratory devices are exploratory spokes.

28. The computer-readable memory device of claim 23, wherein the first and second subsets of instructions direct each exploratory device to be adjusted to define a perimeter data point endpoint for each exploratory device that separates data points having discrete values within the predefined class from data points having values not in the predefined class.

29. A computer-readable memory device encoded with a set of instructions for detecting clusters of a data space, the set of instructions having:
- a first subset of instructions directing a predetermined number of exploratory devices to be traversed from a predefined seed data point located within the cluster, wherein the first subset of instructions directs each exploratory spoke to be:
  - a) expanded by a preselected step size to a current data point having discrete values within a current data point class;
  - b) contracted by an amount that reflects how likely the current data point class is not in the defined data point class;
  - c) monitored in order to compute interspoke forces and appropriately adjust each exploratory spoke;
- a second subset of instructions directing a perimeter data point endpoint to be defined for each exploratory device; and
- a third subset of instructions directing the perimeter data point endpoints to be connected to define an outline of the cluster for detecting and tracking the cluster.

30. The computer-readable memory device of claim 29, steps a)–c) are repeated a predetermined amount to define a perimeter data point endpoint for each exploratory device that separates data points having discrete values within the predefined class from data points having values not in the predefined class.

31. A computer-readable memory device encoded with a set of instructions for detecting clusters of a data space, the set of instructions having:
- a first subset of instructions directing a predetermined number of exploratory devices to be traversed from a predefined seed data point located within the cluster;
- a second subset of instructions directing a perimeter data point endpoint to be defined for each exploratory device; and
- a third subset of instructions directing the perimeter data point endpoints to be connected to define an outline of the cluster for detecting and tracking the cluster;

wherein the exploratory devices expand from the seed data point to a subsequent data point and contract from the subsequent data point to a new data point, wherein the exploratory devices are subject to spring forces when the exploratory devices are expanded and contracted.

32. A method for detecting a cluster of sparse data, comprising:
- traversing exploratory devices within a region around an initial seed data point;
- performing an exploratory cyclic process having expand, contract and spring steps to inspect the region surrounding the seed data point for each exploratory device and locating a current data point having discrete values within a predefined data class; and
- connecting endpoints of each region traversed by the exploratory devices to define an outline around the cluster of sparse data.

33. The method of claim 32, wherein the sparse data is comprised of data points, each data point being defined by a discrete value, and wherein the discrete values of all of the data points of the cluster of sparse data are within a predefined class.

34. The method of claim 33, wherein traversing a predefined number of exploratory devices and defining a perimeter data point endpoint comprises selectively exerting at least one of expansion, contraction and spring forces on a predefined number of exploratory devices within the region surrounding the seed data point to define a perimeter data point endpoint that separates data points having discrete values within the predefined class from data points having values not in the predefined class.

35. The method of claim 34, wherein defining a perimeter data point endpoint comprises exerting the forces iteratively a predetermined amount to define a perimeter data point endpoint for each exploratory device that separates data points having discrete values within the predefined class from data points having values not in the predefined class.

36. The method of claim 32, wherein the data is a multidimensional data and wherein the exploratory devices are traversed in multidimensional space.

37. The method of claim 32, wherein the exploratory devices are exploratory spokes.

38. The method of claim 32, wherein traversing a predefined number of exploratory devices and defining a perimeter data point endpoint comprises adjusting each exploratory device to define a perimeter data point endpoint for each exploratory device that separates data points having discrete values within the predefined class from data points having values not in the predefined class.

* * * * *